US007942032B2

(12) United States Patent
Walker et al.

(10) Patent No.: US 7,942,032 B2
(45) Date of Patent: May 17, 2011

(54) METHOD FOR DETECTING IMPACT DAMAGE IN A STRUCTURE

(75) Inventors: Lawrence John Walker, Karrinyup (AU); Nigel Laxton, Mt. Hawthorn (AU)

(73) Assignee: Structural Monitoring Systems Ltd., Osborn Park, Western Australia (AU)

(*) Notice: Subject to any disclaimer, the term of this patent is extended or adjusted under 35 U.S.C. 154(b) by 228 days.

(21) Appl. No.: 12/296,081

(22) PCT Filed: Apr. 4, 2007

(86) PCT No.: PCT/AU2007/000455
§ 371 (c)(1), (2), (4) Date: Oct. 3, 2008

(87) PCT Pub. No.: WO2007/112511
PCT Pub. Date: Oct. 11, 2007

(65) Prior Publication Data

US 2009/0173139 A1 Jul. 9, 2009

(30) Foreign Application Priority Data

Apr. 4, 2006 (AU) ................................ 2006901755

(51) Int. Cl.
*G01M 7/00* (2006.01)

(52) U.S. Cl. ...................................................... 73/12.08

(58) Field of Classification Search ................. 73/12.08, 73/49.2, 760, 12.13, 799
See application file for complete search history.

(56) References Cited

U.S. PATENT DOCUMENTS

| | | | | |
|---|---|---|---|---|
| 4,104,906 | A | 8/1978 | Oertle | |
| 4,135,386 | A | 1/1979 | Peterson et al. | |
| 4,145,915 | A | 3/1979 | Oertle et al. | |
| 5,419,200 | A * | 5/1995 | Burns et al. | 73/760 |
| 5,770,794 | A | 6/1998 | Davey | |
| 6,715,365 | B2 | 4/2004 | Davey | |
| 6,748,791 | B1 * | 6/2004 | Georgeson et al. | 73/12.13 |
| 7,500,383 | B2 * | 3/2009 | Davey | 73/49.2 |
| 2002/0029614 | A1 | 3/2002 | Davey | |

FOREIGN PATENT DOCUMENTS

WO 01/98746 A1 12/2001

OTHER PUBLICATIONS

International Search Report for parent application PCT/AU2007/000455, having a mailing date of May 17, 2007.

* cited by examiner

*Primary Examiner* — Lisa M Caputo
*Assistant Examiner* — Octavia Davis
(74) *Attorney, Agent, or Firm* — Andrus, Sceales, Starke & Sawall, LLP

(57) ABSTRACT

A method of detecting impact damage of a structure having a first surface exposed to potential impacts from an object comprises providing a sensor having a body portion that has a surface provided with an elongated channel. The sensor is fixed to a second surface of the structure such that a conduit is formed by the channel and the surface. The surface is on an opposite side of the structure to the first surface. A pressure differential is established between the conduit and a reference pressure adjacent the conduit. Monitoring is conducted for detecting any change in the differential pressure that may be indicative of a fracture or crack propagating in the second surface.

9 Claims, 3 Drawing Sheets

16
10
18
18'
16'
14
12
12
14
20
20'
12

METHOD FOR DETECTING IMPACT DAMAGE IN A STRUCTURE

CROSS-REFERENCE TO RELATED APPLICATIONS

This application is the U.S. national stage application of International Application No. PCT/AU2007/000455, filed Apr. 4, 2007, which International application was published on Oct. 11, 2007, as International Publication No. WO 2007/112511 A1 in the English language, which application is incorporated herein by reference. The International application claims priority of Australian Patent Application No. 2006901755, filed Apr. 4, 2006, which application is incorporated herein by reference.

FIELD OF THE INVENTION

The present invention relates to a method for detecting impact damage in a structure.

BACKGROUND OF THE INVENTION

In some structures, the energy of an impact by an object on a first surface of a structure may manifest in cracks that open onto a second opposing surface of the structure. This phenomenon is often referred to as back face damage, as it is the "back face" relative to the impact site that exhibits such damage.

Composite materials, which are often referred to simply as "composites", are now commonly used in high technology applications. One common example of a composite is fibre reinforced plastics, which has fibres embedded in a cured resin. Composites have the advantages of high strength and stiffness for their unit mass.

One disadvantage of composites is their poor resistance to impact damage. As composites are commonly used in a sheet or sheet-like form, impact damage typically occurs in the through thickness direction. Composites exhibit little or no plastic deformation, such that impact energy is largely absorbed as either elastic deformation or structural damage. Such structural damage can occur internally within the composite material. Alternatively, the damage can manifest itself on the opposing surface to the surface receiving the actual impact. In such cases, the surface receiving the impact may show little or no evidence of either impact or damage.

Such damage is often referred to as Barely Visible Impact Damage (BVID), as the damage is often difficult or impossible to visually observe by the naked eye. Often the only evidence of impact that can be observed visually may be fine cracks that are created on the opposing surface to the actual impact.

SUMMARY OF THE INVENTION

The present invention provides a method of detecting impact damage of a structure having a first surface exposed to potential impacts the method comprising:

- providing a sensor having a body portion that has surface provided with at least one channel;
- affixing the surface of the body portion to the second surface of the structure such that at least one conduit is formed by the at least one channel and the second surface, the second surface being on an opposite of the structure to the first surface;
- establishing a pressure differential between the at least one conduit and a reference pressure adjacent the at least one conduit;
- monitoring for a change in the differential pressure of the at least one conduit.

When the structure is a composite having at least two plies of fibres arranged between the first and second surfaces wherein a first of the plies is adjacent the second surface, the affixing may comprise orientating a substantial portion of the at least one channel to extend generally transverse to a direction of orientation of the fibres in the first ply.

Alternately when the structure is a composite having at least two plies of fibres arranged between the first and second surfaces wherein a first of the plies is adjacent the second surface the affixing may comprise orientating a substantial portion of the at least one channel to extend the generally obliquely to a direction of orientation of the fibres in the first ply.

In one embodiment the establishing pressure differential may comprise placing the at least one conduit in fluid communication with a pressure source of a pressure higher than the reference pressure.

However in an alternate embodiment the establishing pressure differential may comprise placing the at least one conduit in fluid communication with a pressure source of a pressure less than the reference pressure.

In various embodiments providing the sensor may comprise providing the sensor with a body portion having two parallel and spaced apart first lengths and a plurality of mutually spaced apart transverse lengths extending between the first lengths, wherein the at least one channel extends along said first lengths and said transverse lengths.

Embodiments of the method may further providing a first connector in fluid communication with one of the channels and a pressure source at a pressure different to the reference pressure.

Further embodiments of the method may comprise providing two connectors in fluid communication with one of the channels at spaced apart locations.

These embodiments may also comprise conducting a continuity test of the conduit formed by the one channel by monitoring for a flow of fluid from one connector through and out of the other connector.

BRIEF DESCRIPTION OF THE DRAWINGS

In order that the invention may be more easily understood, embodiments will now be described, by way of example only, with reference to the accompanying drawings, in which.

DETAILED DESCRIPTION OF THE PREFERRED EMBODIMENTS

Figure 1:
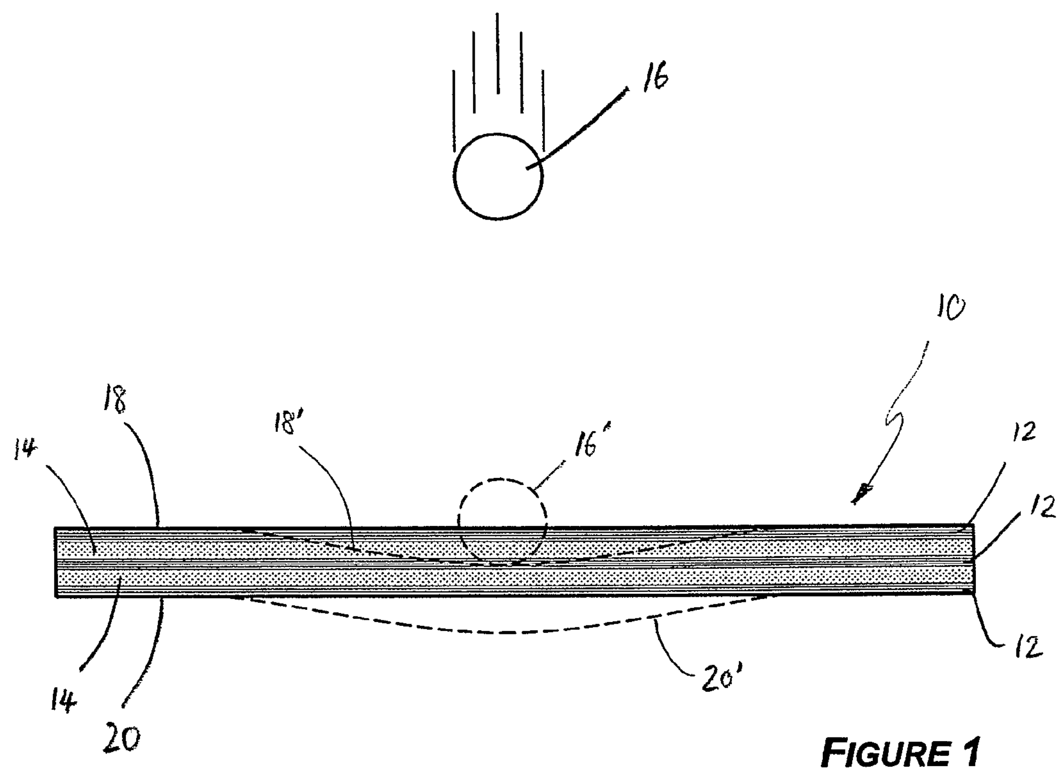
FIG. 1: is a schematic cross sectional view of a composite receiving an impact.

FIG. 1 shows a schematic cross sectional view of a structure 10, which is a composite material having five orthogonal plies of fibres set within a plastics material. In this structure 10, the fibres within each ply are unidirectional. Three of the plies (the two outer plies and the middle ply, as indicated by the reference numeral 12) are disposed within the structure 10 to extend in a direction that is parallel to the plane of the page. Two of the plies (the two inner plies 14 that are each arranged between an outer ply 12 and middle ply 12) are arranged within the structure 10 to extend in a direction that is perpendicular to the plane of the page. The structure 10 has a first surface 18 that is exposed to potential impacts and an opposite surface 20.

FIG. 1 depicts an object 16 travelling generally toward and portion to impact with, first surface 18 of the structure 10.

The same object is depicted in phantom lines during impact as object 16' with phantom lines 18' and 20' depicting the resulting deformation of the first and second surfaces respectively. Upon impact the energy of the object 16 causes elastic deformation of the structure. It is to be appreciated that the kinetic energy of the object 16 (relative to the surface 18) and the properties of the actual structure 10 are factors that may influence the impact energy and consequently the extent of damage caused to the structure 10. If the impact energy is sufficient one or more the plies 12, 14 of the structure 10 can sustain damage. As discussed previously, the damage may only be visually apparent on the opposing surface 20 to the surface 18 that actually receives the impact.

Figure 2A:
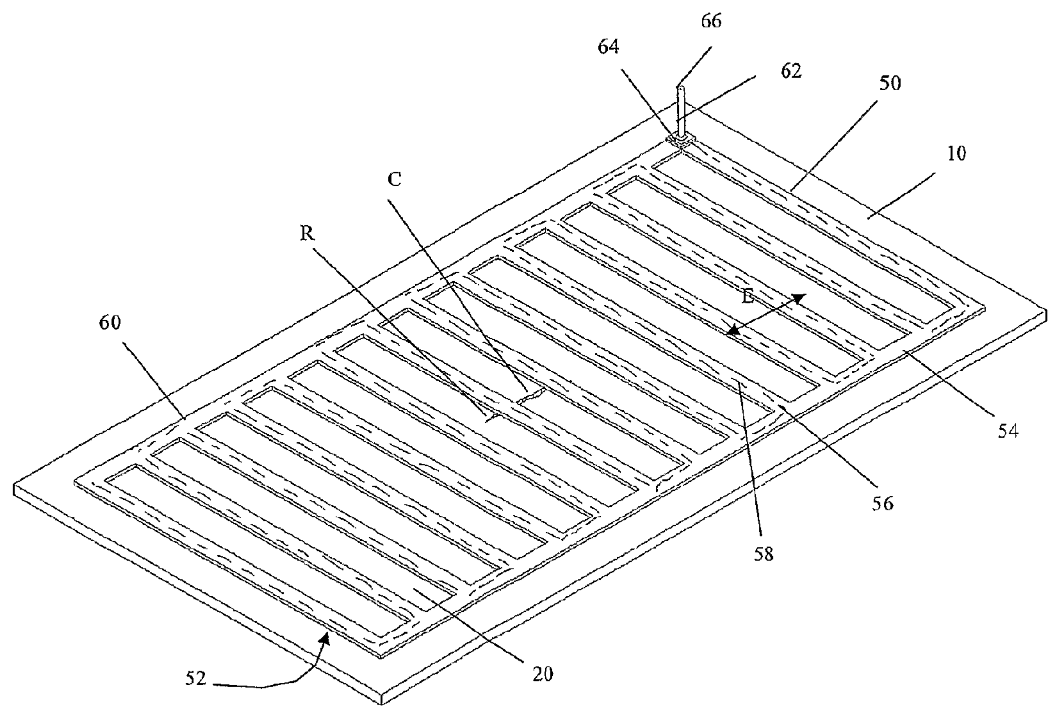
FIG. 2*a*: is a schematic axonometric view of a sensor applied to a surface of a composite in accordance with a first embodiment of the present invention.
Figure 2B:
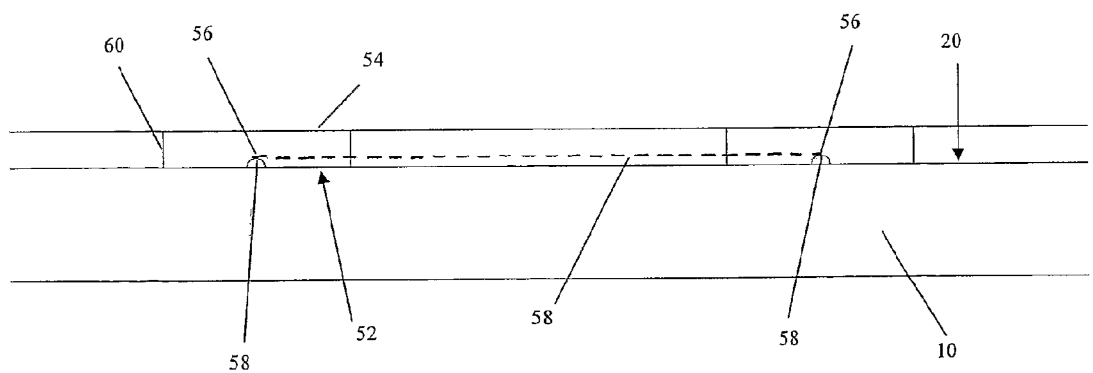
FIG. 2*b*: is a view of a section of the sensors and composites along line E shown in FIG. 2*a*.

FIGS. 2*a* and 2*b* show a schematic view of the second surface 20 of the structure 10. A sensor 50 in accordance with an embodiment of the present invention which has a body portion 54 defining a surface 52 that, in use, is affixed to the second surface 20 of the structure 10. The surface 52 is provided with an elongate channel 56. When the sensor 50 is affixed to the structure 10, the channel 56 together with the second surface 20 form a conduit 58. In the embodiment shown in FIGS. 2*a* and 2*b* the channel 56, and thus the conduit 58, extends in a serpentine manner across the second surface 20 of the structure 10. Each channel 56 is adjacent an edge 60 (either peripheral or internal) of the body portion 54 of the sensor 50.

In this embodiment, the ply of the composite that is adjacent the second surface 20 is elongate in the direction indicated by the double-headed arrow E. As can be seen in FIG. 2*a*, a substantial portion of the channel 56 extends in a direction that is transverse to the direction E.

When the structure 10 is undamaged the conduit 58 is substantially hermetically sealed. Following impact of an object 16 (of sufficient impact energy) on the first surface 18 of the structure 10 a fine crack C may be created in the surface 20. For the purposes of clarity, the crack C has been illustrated schematically such that its width has been greatly exaggerated. It is to be appreciated that in reality the crack C may be difficult or impossible to see with the naked eye.

The sensor 50 has a connector 62 disposed at an end region of the channel 56. The connector 62 is in fluid communication with the channel 56 via a hole (not shown) in the body portion 54 of the sensor 50. The connector 62 enables the sensor 50 to be plumbed within a differential pressure monitoring system. Such system may be either a relative positive or negative pressure system. A relative positive pressure system is one where pressure in the conduit 58 is positive relative to ambient pressure, whereas a relative negative pressure system is one where pressure in the conduit 58 is negative (i.e. a relative vacuum) relative to ambient pressure. It is to be appreciated that the sensor 50 may be plumbed directly to a monitoring instrument (not shown) of the system or other sensor elements (also not shown) within the system. The connector 62 illustrated in FIG. 2*a* has a flanged portion 64, which is affixed to the body portion 54 about the hole, and a tube portion 66. Tubing, such as flexible piping, can be attached to the tube portion 66 to plumb the sensor 50 within the system.

The connector 62 may be one of two connectors 62 each disposed at spaced apart location in the channel, including for example at opposite end regions of the channel 56. Where the sensor 50 is provided with two connectors 62 the sensor 50 may be tested for the presence of a blockage in the portion of the conduit 58 between the connectors which prevents continuity along the length of the conduit 58. Such a continuity test may be performed by attempting to pass fluid through the conduit 58 from one connector 62 to the other connector 62. When continuity testing is not being conducted one of the connectors can be shut or blocked by action of a value or stop.

Impact damage may be manifested in one or more cracks C formed at the surface 20 of the structure 10, which are likely to be elongate in the direction E of the fibres in the ply adjacent the surface 20. The presence of a crack C that intersects the conduit 58 and extends from a region R on the surface 20 (that is beyond the edge 60 of the body portion 54) will cause fluid to flow through the crack C due to the pressure differential between the conduit 58 and the ambient environment. The fluid flow will cause a change in the pressure state of the conduit 58. The fluid flow through, and/or change in pressure state of, the conduit 58 can be measured by the monitoring instrument. Furthermore, the fluid flow through, and/or change in pressure state of, the conduit 58 is indicative of the presence of the crack C, which is also indicative of impact damage to the structure that has created the crack C.

Thus, impact damage of a structure 10, that has resulted in cracking of the surface 20, can be detected without visual inspection of the structure 10. Furthermore, cracks that cannot be readily observed by the naked eye may be detected by the monitoring system.

Figure 3:
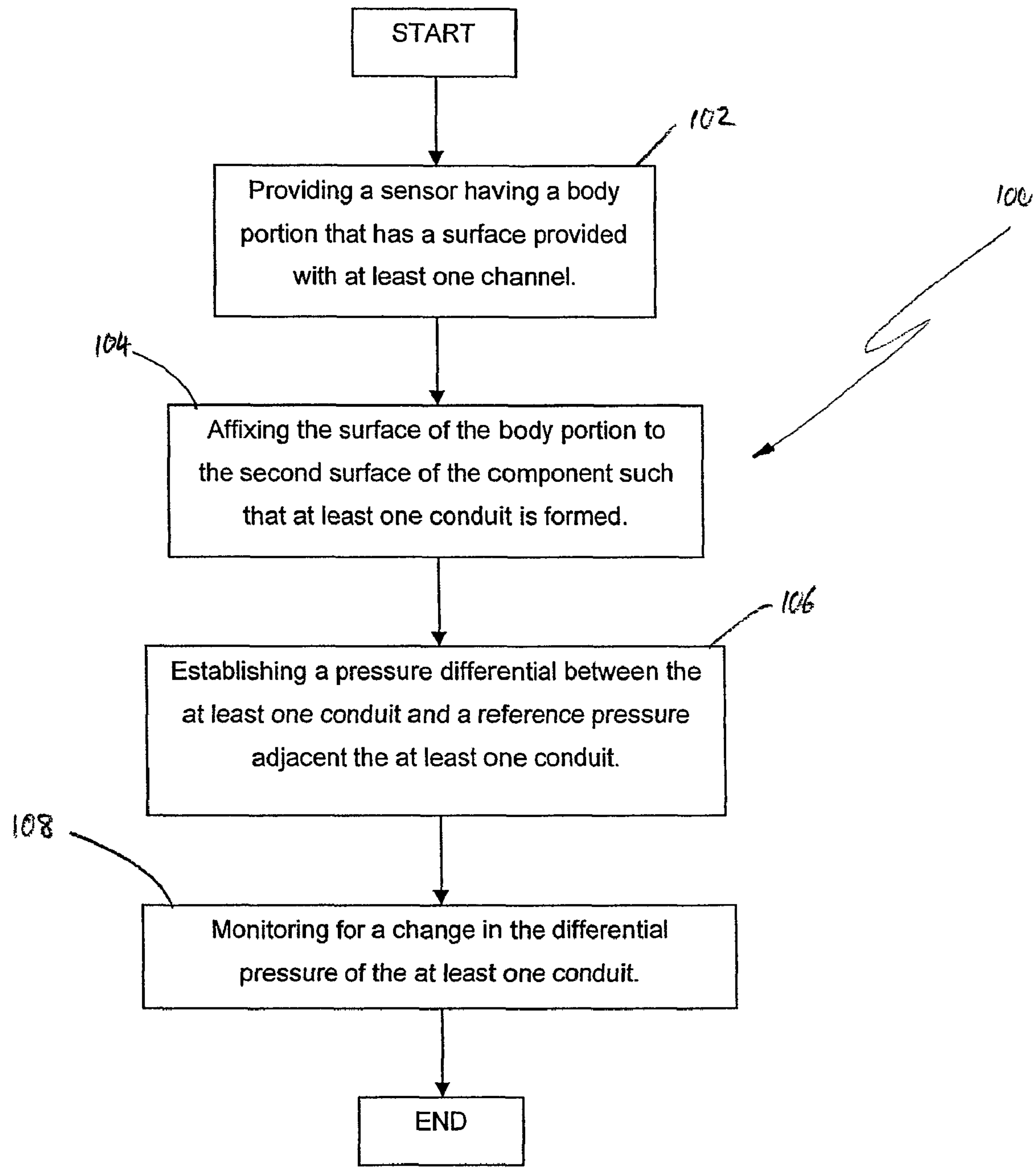
FIG. 3: is a flow chart of a method in accordance with a second embodiment of the present invention.

FIG. 3 shows a method 100 for detecting impact damage of a structure in accordance with a second embodiment, the structure having a first surface and a second surface. The method includes the step 102 of providing a sensor having a body portion that has a surface provided with at least one channel. One example of a sensor is illustrated in FIG. 2.

Step 104 involves affixing the surface of the body portion to the second surface of the structure such that at least one conduit is formed. Step 106 involves establishing a pressure differential between the at least one conduit and a reference pressure adjacent the at least one conduit. The reference pressure may pressure above or below atmospheric pressure, or may be atmospheric pressure. The reference pressure may be provided in a closed environment formed on the second surface of the structure. Alternatively, the reference pressure may be an open environment, such as the atmosphere surrounding the structure.

The method 100 further involves the step 108 of monitoring for a change in the differential pressure of the at least one conduit. The change in the differential pressure of the at least one conduit is indicative of damage in the structure resulting from an impact on the first surface.

It will be understood to persons skilled in the art of the invention that many modifications may be made without departing from the scope of the invention. For example, it is to be appreciated that a sensor may be provided with two or more channels (such that two or more conduits are formed), with each conduit in fluid isolation from the other conduits when the structure 10 is undamaged.

It is to be appreciated that the separation of portions of the channel 56 determines the maximum length of a crack (in the crack propagation direction E) on the surface of a structure that can be undetected by the sensor. This may also influence the minimum energy of an impact that can be assured of detection. Similarly, in an embodiment in which a plurality of channels are provided the separation of adjacent channels can influence the maximum length of a crack that can be undetected.

Alternatively or additionally, two or more like sensors can be provided on a surface 20 of a structure 10. The maximum length of a crack (in the crack growth direction E) that may be undetected is influenced by the separation of the channels (also in the crack growth direction E) in adjacent sensors.

The sensor(s) may be aligned obliquely to the elongate direction E of fibres of the ply adjacent the surface 20. However, it is to be appreciated that, in structures in which the fibres in the ply adjacent the surface are unidirectional, reliability of crack detection decreases as the angle between the ply orientation and the channel(s) decreases.

It is to be appreciated that the connectors may be of any desired shape and structure, provided that the connectors fulfill the function of connecting the conduit(s) within the sensor to the tubing that plumbs the sensor into the monitoring system. Furthermore, the connection(s) should also form a substantial hermetic seal.

In an alternative embodiment, the tubing to plumb the sensor into the monitoring system may be affixed directly to the body portion. Accordingly, in such an alternative embodiment the connector may be omitted.

The sensor can be affixed to the structure by any convenient method. For example, adhesives and/or sealants may be employed. Alternatively, in embodiments in which the structure and sensor are made of plastics materials, plastic welding (either direct or indirect) may be employed. Alternatively, a bond using a combination of heat and pressure may be employed. In a further alternative, a solvent product may be delivered to one or both of the surfaces of the structure and sensor to be affixed. Upon contact the solvent product can fuse the structure and the sensor together. In a further alternative, diffusion bonding may be employed. The connector may similarly be affixed to the body portion of the sensor by any convenient method.

It is to be appreciated that while embodiments of the present invention are described in relation to composite materials, the same or alternate embodiments of the invention may also be applied to monitor for the presence of back face damage which arises from impact on the first surface of the structure, in structures made from other materials.

The body portion 54 of the sensor 50 depicted in FIG. 2 has an overall shape of two generally parallel elements with a number of transverse elements that extend between the two parallel elements. However, it is to be appreciated that the overall shape of the body portion may take alternative forms. For example, the body portion may have a simple linear overall shape, or may be generally arcuate. Alternatively or additionally, the body portion may have one or more vertices. Accordingly, the body portion itself may be serpentine in overall shape.

Applicant's co-pending Australian Patent Application No. 2006901823 the contents of which are incorporated herein by reference, describes various embodiments of a laminated sensor that may be used in performing embodiments of the present invention.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method of detecting impact damage of a structure having a first surface and an opposite second surface, the method comprising:

exposing the first surface to potential impacts with one or more bodies;

providing a sensor having a body portion that has surface provided with at least one channel;

affixing the surface of the body portion to the second surface of the structure such that at least one conduit is formed by the at least one channel and the second surface, the second surface being on an opposite side of the structure to the first surface;

establishing a pressure differential between the at least one conduit and a reference pressure adjacent the at least one conduit; and monitoring for a change in the differential pressure of the at least one conduit.

2. A method as claimed in claim 1, wherein when the structure is a composite having at least two plies of fibres arranged between the first and second surfaces wherein a first of the plies is adjacent the second surface, the affixing comprises orientating a substantial portion of the at least one channel to extend generally transverse to a direction of orientation of the fibres in the first ply.

3. A method as claimed in claim 1, wherein when the structure is a composite having at least two plies of fibres arranged between the first and second surfaces wherein a first of the plies is adjacent the second surface the affixing, comprises orientating a substantial portion of the at least one channel to extend the generally obliquely to a direction of orientation of the fibres in the first ply.

4. The method according to claim 1 wherein establishing the pressure differential comprises placing the at least one conduit in fluid communication with a pressure source of a pressure higher than the reference pressure.

5. The method according to claim 1 wherein establishing the pressure differential comprises placing the at least one conduit in fluid communication with a pressure source of a pressure less than the reference pressure.

6. The method according to claim 1 wherein providing the sensor comprises providing the sensor with a body portion having two parallel and spaced apart first lengths and a plurality of mutually spaced apart transverse lengths extending between the first lengths, wherein the at least on channel extends along said first lengths and said transverse lengths.

7. The method according to claim 1 further comprising providing a first connector in fluid communication with one of the channels and a pressure source at a pressure different to the reference pressure.

8. The method according to claim 1 further comprising providing two connectors in fluid communication with one of the channels at spaced apart locations.

9. The method according to claim 8 wherein further comprising conducting a continuity test of the conduit formed by the one channel by monitoring for a flow of fluid from one connector through and out of the other connector.

* * * * *